United States Patent [19]

Hewlings

[11] Patent Number: 4,854,780
[45] Date of Patent: Aug. 8, 1989

[54] SYSTEM AND METHOD OF DAMPING WAVES ON A BODY OF WATER USING TOWABLE FIELD OF ICE PIECES OF RANDOM SIZES

[76] Inventor: Winston G. Hewlings, R.R. 1, Box 448, Rte. 36, Swainton, Vt. 05488-9736

[21] Appl. No.: 132,607

[22] Filed: Dec. 14, 1987

[51] Int. Cl.$^4$ .............................................. E02B 3/04
[52] U.S. Cl. .................................... 405/211; 405/217; 405/21; 405/61
[58] Field of Search .................. 405/217, 61, 211, 21, 405/15, 26; 62/259, 260

[56] References Cited

U.S. PATENT DOCUMENTS

| | | | |
|---|---|---|---|
| 3,614,873 | 10/1971 | Cole et al. ......................... | 405/61 X |
| 4,048,808 | 9/1977 | Duthweiler ......................... | 405/217 |
| 4,323,322 | 4/1982 | O'Rourke et al. .................. | 405/217 |
| 4,523,879 | 6/1985 | Finucane et al. ................... | 405/217 |
| 4,634,315 | 1/1987 | Owen et al. ........................ | 405/217 |

Primary Examiner—Dennis L. Taylor

[57] ABSTRACT

A wave damping system and method for use on a body of water. A floating collar structure is oriented to define a restraining area in which pieces of ice of random size are disposed. The floating collar has a shield to maintain the ice pieces therein. The collar structure is connected to a positioner element, such as an anchored buoy, a tug boat or a submersible to position and maintain the collar structure in a substantially stationary location on a body of water relative to an offshore or onshore element to be protected. The ice pieces form a stabilizing field of ice in at least a portion of the restraining area whereby to dampen waves in the restraining area to protect the offshore or onshore structure against the damaging effects of such waves.

20 Claims, 4 Drawing Sheets

SYSTEM AND METHOD OF DAMPING WAVES ON A BODY OF WATER USING TOWABLE FIELD OF ICE PIECES OF RANDOM SIZES

The present invention relates to a wave damping system and method for use on a body of water to dampen the damaging effects of waves directed toward an onshore or an offshore structure, such as a drilling rig or a ship in distress, to protect some during foul weather conditions.

Various wave damping techniques have been developped in order to dampen waves to protect offshore structures, such as an oil drilling platform. Such are disclosed, for example in U.S. Pat. No. 3,029,606, wherein there is described the provision of a film-like and flexible sheet of material which is positioned on the surface of the water adjacent to a structure to be protected. The sheet of material protects the structure against the destructive effect of the breaking waves. U.S. Pat. No's 4,234,266; 3,969,901 and 3,237,414 teach wave attenuation by using bouyant members held spaced apart and anchored to the bottom of a body of water to act as breakwaters. All these structures are used to dissipate the force of the waves nd to dampen their breaking effect.

It is a feature of the present invention to provide a novel system and method for damping waves wherein pieces of ice of random size are used to effect this damping.

Although U.S. Pat. No. 3,614,873 teaches using particles of dry ice (which is frozen $CO_2$, not water) or the like, to form a cake on a surface of water to enable the removal of oil spilled on water, no one as heretofore suggested the use of ice pieces as a protective medium to shield offshore or onshore structures or ships from the damaging effects of breaking waves, in fact, all the prior art teaches to the contrary and namely the protection of such structures against the damaging effects of ice. See for example U.S. Pat. No. 4,547,093 which teaches a method of decelerating ice as it passes over drag elements rather that buttressing the offshore installation, as is also taught by the prior art. Fortifying offshore structures has been a very expensive way of protecting them from drift ice and breaking waves.

I have observed that at freezing or near-freezing temperatures and with strong winds, the wind chill will cause water spray to freeze. Frozen water and spray begin to build-up to form a slush and the particles come together and coalesce. The wind and waves accumulate the slush which builds-up and gels. The colder the temperature, the faster an ice field is produced. As the ice forms, waves are dampened to mere undulations.

It is a further feature of the present invention to provide a floating collar structure capable of being oriented on a body of water to restrain and position a surface field of ice at a predetermined location to dampen waves to protect offshore or onshore structures or vessels against the damaging effects of breaking waves.

According to the above features the invention provides a wave damping system for use on a water surface. The system uses a floating collar structure capable of being oriented to define a restraining area. The collar structure is also provided with a shield means to prevent the ice pieces from escaping from the collar structure. The collar structure is secured to a positioner element to maintain the collar structure in a substantially stationary location on a body of water at a predetermined position relative to an offshore or onshore element or structure to be protected. An ice making device is positioned relative to the collar structure for making and releasing ice pieces inside the restraining area to form a stabilized surface area whereby to dampen waves in the restraining area whereby to dampen waves and breaking waves in the direction of the offshore or onshore structure.

According to another aspect, my invention provides a method of damping waves to protect an offshore or onshore element on a body of water from the damaging effects of waves. The method consists in towing a floating collar structure with a confined field of accumulated pieces of ice of random size in at least a portion of the area within the floating collar structure to a predetermined location. The floating structure is maintained between the oncoming waves and the element to be protected to dampen waves and breaking waves heading in the direction of the offshore or onshore structure, such as a vessel in distress in open water or aground.

The invention will now be described with reference to the drawings in which.

Figure 1:
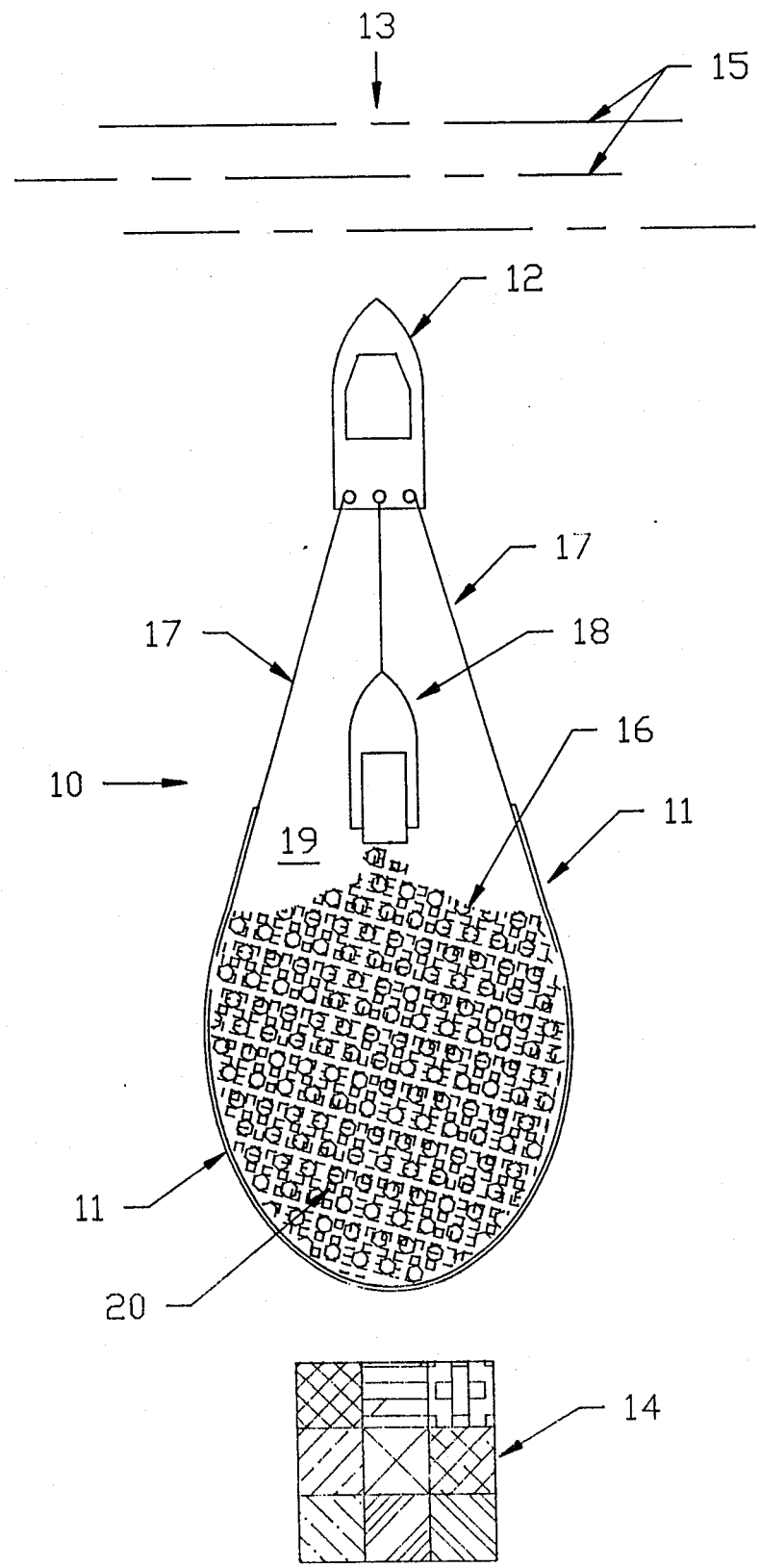
FIG. 1 is a schematic illustration showing a tug boat positioning the collar structure and ice sheet relative to an offshore platform.

Referring to FIG. 1, there is shown the wave damping system of the present invention as generally denoted by reference numeral 10. The system comprises a floating collar structure 11 filled with pieces of ice 16 of random size. The floating collar is oriented by suitable positioning means, such as the tug boat 12, on a body of water and at a predetermined position relative to an offshore element 14 to be protected against the damaging effects of waves or breaking waves 15 heading in its direction, as shown by arrow 13.

As herein shown, suitable attachment means in the form of ropes 17 secure the floating collar 11 to the tug boat 12. An ice making device 18 is also usually, but not necessarily, secured to the boat 12 and positioned inside the restraining area 19 of the floating collar 11. This device forms ice and releases it in the restraining area where ice will start accumulating in the downstream end of the restraining area 19 to start forming a stabilized surface 20 of ice pieces for damping the waves 15. The tug boat 12 positions itself so that the floating collar 11 is positioned close to the structure 14. The tug can then anchor at the desired position. The structure 14 is shown as an offshore drilling platform, but it could also be a ship in distress or other elements requiring protection from the waves.

It can also be appreciated that when the system is utilized in a climatic area having a freezing environment, that the spray of water caused by high winds and breaking waves will promote the formation of the ice particles and cause ice build-up to form a thick layer of ice in at least parts of the ice field. The water about the ice pieces will also turn to slush and eventually solidify or gel and promote the growth or expansion of the the ice field. When climatic conditions permit, as when temperatures are at or below freezing and winds are strong, additional slush ice could be made by spraying water into the air from the ice making vessel or from jets attached to floating hoses fed with water pumped from a drilling platform or other offshore or onshore structure.

Figure 2:
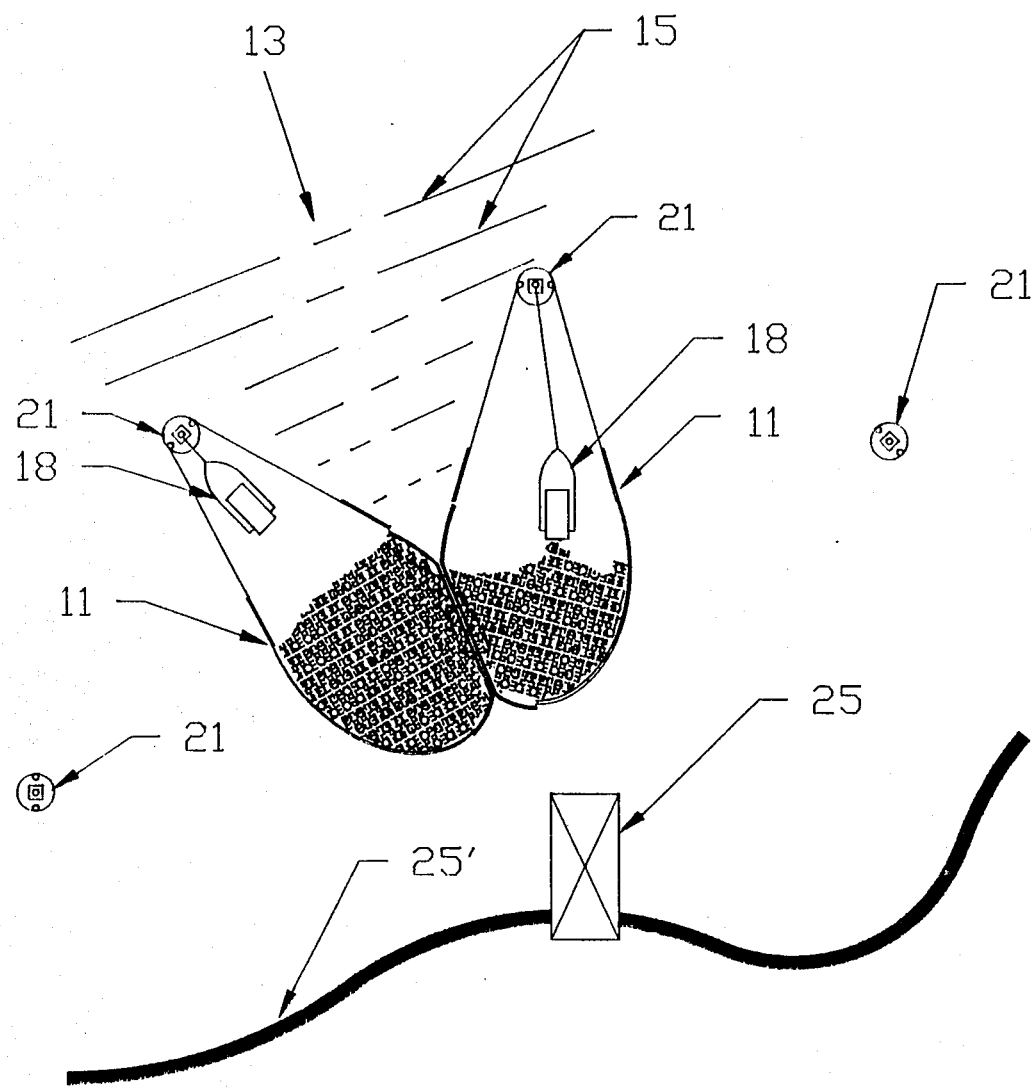
FIG. 2 is a further schematic illustration showing two collar structures attached to buoys which are anchored to the sea bed at predetermined locations relative to an onshore structure.
Figure 3:
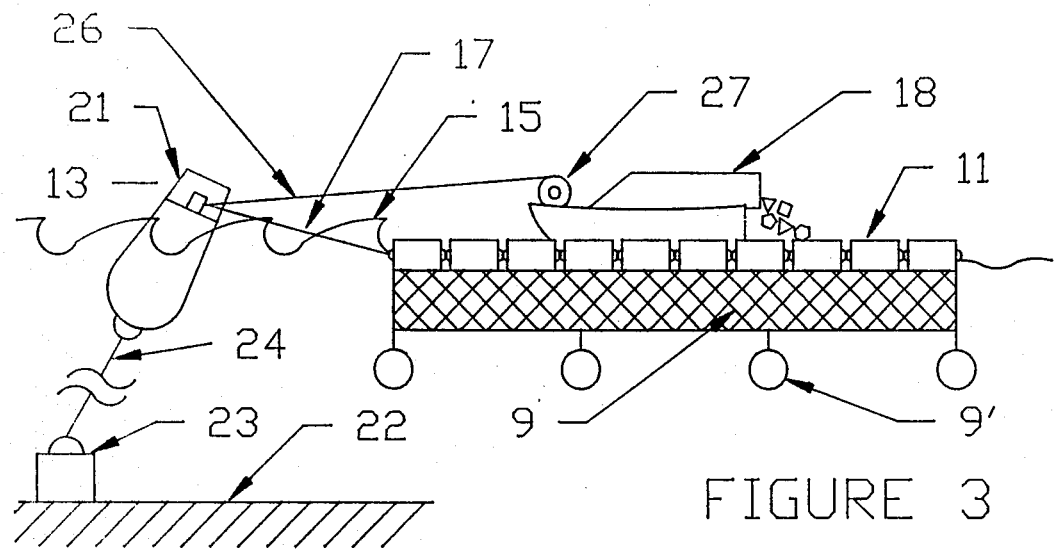
FIG. 3 is a side view illustration of the present invention.

Referring to FIGS. 2 and 3, there is shown another example of the use of the system of this invention. As shown in these Figures, one or more buoys 21 is anchored to the sea floor 22 by a dead weight anchor 23 and cable 24. These buoys 21 are located a predetermined distance from the stationary structure 25 to be protected, herein located on a shoreline 25. When a bad storm is forthcoming, one or more floating collars 11 are secured to the buoys positioned in the direction of the wind or storm as shown by arrow 40. Such direction is easily predictable, wall in advance, by weather satellites. With such a permanent offshore installation, and when protecting offshore structures, such as drill rigs, it is preferred to have buoys anchored all around the structure to protect it from waves coming from any predictable direction.

As shown more clearly in FIG. 3, the ice making device 18 is connected to its associated buoy 21 by a cable 26 wound on a drum 27 secured to the boat 18. The drum 27 could be controlled from the offshore or onshore structure whereby to position the ice maker anywhere in the restraining area 19 of the floating collar. For example, the ice making device 18 could be positioned closer to the rear of the area 19 and moved to the front as the ice field builds up.

Figure 4:
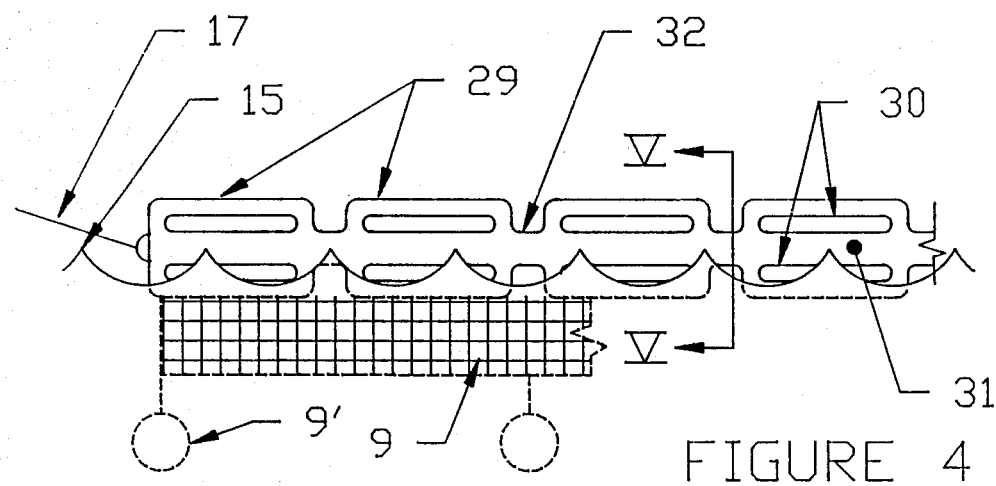
FIG. 4 is a fragmented side view of inflatable floats used to form the collar structure.
Figure 5:
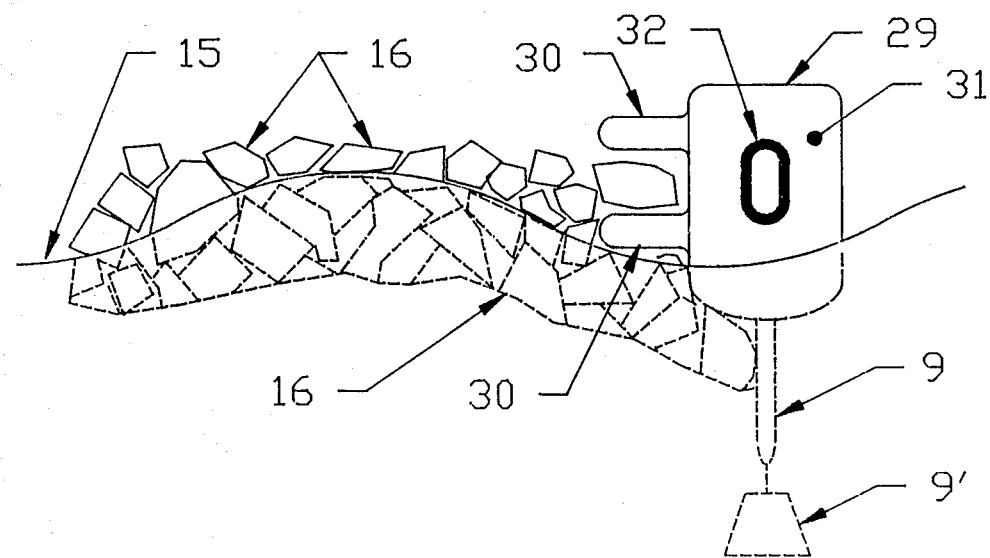
FIG. 5 is a section view along section lines V—V of FIG. 4.
Figure 6:
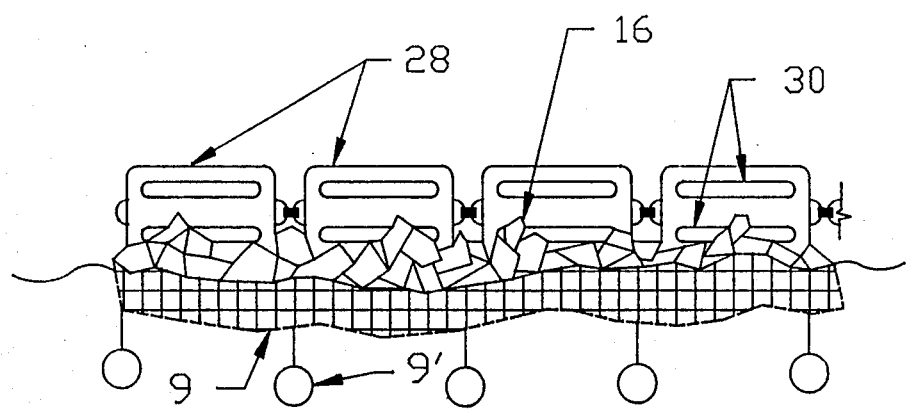
FIG. 6 is a fragmented side view of a solid core floating collar.

Although not shown, it is conceivable that the floating collar 11 and ice making device be positioned automatically from the offshore structure by means of remotely controlled steering devices. Also, the floats forming the floatation collar 11 could be conventional hard core floats 28, as shown in FIG. 6 or inflatable floats 29, as shown in FIGS. 4 and 5. These floats 28 and 29 may also be provided with stabilizing ribs 30 for maintaining the ice pieces 16 in an arrested position against some of the floats to also promote agglomaration and prevent ice pieces from escaping. The floating collar is also provided with a shield formed by a suspended curtain or curtains or nets 9 to inhibit loss of ice. Weights 9' are secured to the lower ends of the nets to keep them extended.

As can be seen in FIGS. 4 and 5, the inflatable floats 29 are formed of large chambers 31 interconnected by flexible hollow conduits 32 to channel air in the floatation collar 11. The entire collar 11 could also be inflated automatically by a compressed air device, as is well known in the art.

Figure 7:
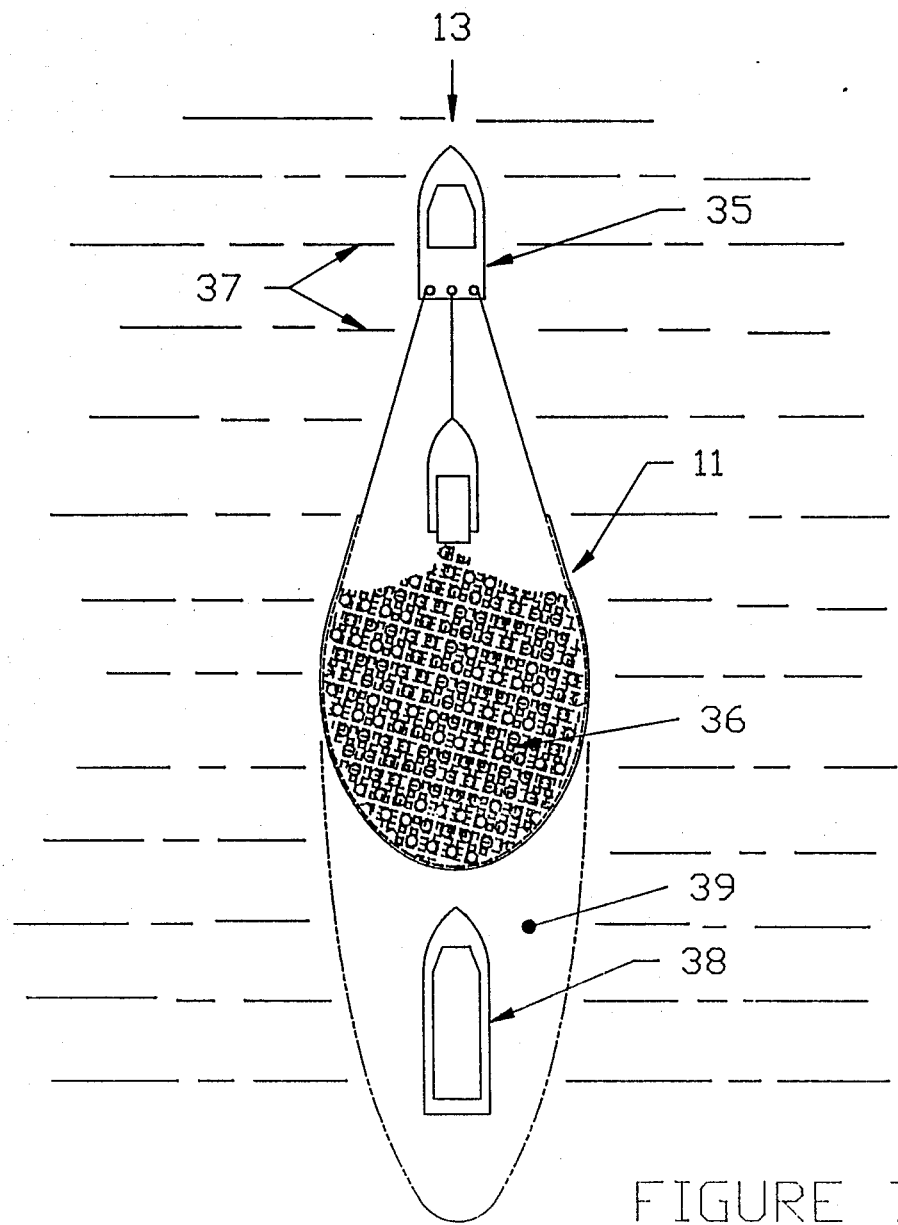
FIG. 7 is a plan view showing another use of the wave damping system and method of the present invention in protecting a vessel in distress.

The method of the present invention also envisages the making of ice pieces, as a towing ship 35, see FIG. 7, proceeds to rescue a ship in distress. Thus, the towing vessel arrives on site with a large field or surface of ice 36 and positions it in direct line between the oncoming waves 37 and the ship 38 in distress. This creates a zone 39 of dampened waves in the area around the ship 38 in distress to permit it to stabilize and be escorted to port or a calmer area. This might also apply to a vessel that had run aground.

It is intended to cover any obvious modifications of the basic system and method described and claimed herein provided they are covered by the broadest claims. It is foreseen that the tug boat could be a fishing trawler type of vessel with rear entry for setting and hauling in the floating collar 11. The vessel then anchors itself when positioned at the desired position to protect an offshore structure. The ice making device 18 could also be permanently installed on the structure 14 being protected and ice pieces conveyed, by suitable means, within the restraining area of the collar 11. It is further forseen that the floating collar structure could be made of two or more floating loops closely spaced with curtains or nets suspended below to prevent ice pieces from floating out of the enclosure. Still further, the accumulation of the ice field may be constituted by natural lumps of ice or a large sheet of ice pre-cut from a remote frozen surface not too far from an offshore or onshore structure to be protected.

I claim:

1. A wave damping system for use on a water surface, said system comprising a floating collar structure capable of being oriented to define a restraining area, shield means connected to said collar structure to maintain ice pieces in said restraining area, attachment means for securing said collar structure to a positioner element to maintain said collar structure in a substantially stationary location on a body of water at a predetermined position relative to an offshore or onshore element to be protected, an ice making device positionable relative to said collar structure for making and releasing said ice pieces inside said restraining area to form a stabilizing field of said ice pieces in at least a portion of said restraining area whereby to dampen waves in said restraining area by said field of ice pieces to dampen waves in the direction of said offshore element.

2. A wave damping system as claimed in claim 1 wherein said positioner element is a towing vessel to which said attachment means is connected for towing said collar structure in position to protect said offshore or onshore element on a body of water from the damaging effect of waves.

3. A wave damping system as claimed in claim 1 wherein said positioner element is constituted by at least one buoy anchored to the floor of a body of water at a predetermined position with respect to said offshore or onshore element to be protected on said body of water, said offshore or onshore element being a stationary element.

4. A wave damping system as claimed in claim 3 wherein there are two or more of said buoy anchored at predetermined angles from said element to be protected and wherein one of said collar structure is connected to each buoy.

5. A wave damping system as claimed in claim 3 wherein said element to be protected is an offshore drilling platform.

6. A wave damping system as claimed in claim 3 wherein said element to be protected is an onshore installation.

7. A wave damping system as claimed in claim 2 wherein said element to be protected is a ship in distress on said body of water or aground next to a body of water.

8. A wave damping system as claimed in claim 1 wherein said collar structure is constituted by a plurality of floats interconnected to an attachment cable forming said attachment means.

9. A wave damping system as claimed in claim 8 wherein said floats are inflatable floats interconnected by a flexible hollow conduit to channel air to said floats for inflating same.

10. A wave damping system as claimed in claim 8 wherein said floats are provided with stabilizing ribs for maintaining said ice pieces in an arrested position against some of said floats in said restraining area.

11. A wave damping system as claimed in claim 1 wherein said shield means is a net suspended below said floats to substantially inhibit loss of ice pieces from under said floatation collar, and means to maintain said net extended below said floatation collar.

12. A method of damping waves to protect an offshore or onshore element on a body of water from the damaging effects of waves, said method comprising the steps of:
 (i) towing a floating collar structure with an accumulation of pieces of ice in at least a portion of said floating collar structure, on said body of water,
 (ii) maintaining said floating collar structure at a predetermined position relative to said offshore or onshore element, and
 (iii) damping waves with said accumulation of pieces of ice by positioning same in the direction of said offshore or onshore element to protect it against the damaging effects of said waves.

13. A method of damping waves to protect an offshore or onshore element on a body of water, said method comprising the steps of:
 (i) positioning a floating collar structure at a substantially stationary location on a body of water at a predetermined position relative to said offshore or onshore element,
 (ii) releasing ice pieces inside a restraining area defined by said floating collar structure to form a confined field of said ice pieces in at least a portion of said restraining area, and
 (iii) damping waves in said restraining area by said confined field of ice pieces to dampen waves travelling in the direction of said offshore or onshore element to protect it against the damaging effects of said waves.

14. A method as claimed in claim 13 wherein said step (ii) comprises forming ice particles when air temperatures are at or below freezing by spraying water into the air in the restraining area of said floatation collar.

15. A method as claimed in claim 13 wherein said step (ii) comprised making ice pieces in one or more ice making devices positioned in said floating collar structure.

16. A method as claimed in claim 13 wherein said step (ii) comprises anchoring said collar on an axis substantially aligned with said offshore or onshore element and transverse to the direction of movement of said waves.

17. A method as claimed in claim 13 wherein said step (i) comprises positioning at least two of said collars at predetermined positions relative to said offshore or onshore element.

18. A method as claimed in claim 13 wherein said step (ii) comprises attaching said floating collar structure to one or more stationary buoys anchored at a pre-determined position relative to said offshore element, said offshore element being an offshore drilling platform.

19. A method as claimed in claim 13 wherein said step (i) comprises towing said floating collar structure and maintaining it at said substantially stationary location.

20. A method as claimed in claim 13 wherein said onshore element is a stationary object on a shore line.

* * * * *